(12) United States Patent
Johnson et al.

(10) Patent No.: US 10,893,077 B1
(45) Date of Patent: Jan. 12, 2021

(54) MIDDLEWARE-MEDIATED USER-TO-USER SERVICE BETWEEN USERS OF DIFFERENT COMPUTING SYSTEMS

(71) Applicant: Enzyme Health, Inc., Austin, TX (US)

(72) Inventors: Philip L. Johnson, Austin, TX (US); Dustin Travis Downing, Austin, TX (US); Dan Hunter, Okemos, MI (US)

(73) Assignee: Wheel Health, Inc., Austin, TX (US)

( * ) Notice: Subject to any disclaimer, the term of this patent is extended or adjusted under 35 U.S.C. 154(b) by 0 days.

(21) Appl. No.: 16/448,765

(22) Filed: Jun. 21, 2019

(51) Int. Cl.
*H04L 12/66* (2006.01)
*H04L 29/06* (2006.01)
*G06F 16/955* (2019.01)
*H04L 29/08* (2006.01)

(52) U.S. Cl.
CPC ...... *H04L 65/1069* (2013.01); *G06F 16/9566* (2019.01); *H04L 67/02* (2013.01); *H04L 67/16* (2013.01)

(58) Field of Classification Search
CPC ............................ H04L 65/1069; H04L 67/02
See application file for complete search history.

(56) References Cited

U.S. PATENT DOCUMENTS

| | | | |
|---|---|---|---|
| 8,595,025 B2 | 11/2013 | Bailey et al. | |
| 8,799,010 B2 | 8/2014 | Kaundinya et al. | |
| 2004/0148194 A1 | 7/2004 | Wellons et al. | |
| 2007/0136095 A1 | 6/2007 | Weinstein | |
| 2009/0112623 A1 | 4/2009 | Schoenberg | |
| 2013/0060576 A1 | 3/2013 | Hamm et al. | |
| 2013/0060579 A1* | 3/2013 | Yu | H04L 63/10 705/3 |
| 2016/0246936 A1* | 8/2016 | Kahn | G06F 19/3418 |
| 2017/0011194 A1 | 1/2017 | Arshad et al. | |
| 2017/0116384 A1 | 4/2017 | Ghani | |
| 2019/0043621 A1* | 2/2019 | Celmins | H04N 5/2251 |

FOREIGN PATENT DOCUMENTS

| | | |
|---|---|---|
| CA | 2606822 C | 7/2012 |
| CN | 102063578 A | 5/2011 |
| WO | WO-2006/119396 A3 | 3/2007 |

* cited by examiner

*Primary Examiner* — Bo Hui A Zhu
(74) *Attorney, Agent, or Firm* — Winstead PC

(57) ABSTRACT

In an embodiment, a method is performed by a middleware computing platform and includes maintaining an active user pool that includes a plurality of servicing users. The method also includes exposing an on-demand service-request interface to a plurality of user-to-user service platforms. The method further includes receiving, via the on-demand service-request interface, a service request from a particular platform of the plurality of user-to-user service platforms. In addition, the method includes automatically selecting a servicing user from the active user pool based, at least in part, on real-time availability of the plurality of servicing users and information included in the service request. Furthermore, the method includes assigning the servicing user to the service request. The method also includes transmitting, to the servicing user, a uniform resource locator to the particular platform. In addition, the method includes transmitting, to the particular platform, a message identifying the servicing user.

18 Claims, 5 Drawing Sheets

MIDDLEWARE-MEDIATED USER-TO-USER SERVICE BETWEEN USERS OF DIFFERENT COMPUTING SYSTEMS

BACKGROUND

Technical Field

The present disclosure relates generally to network communication and more particularly, but not by way of limitation, to systems and methods for middleware-mediated user-to-user service between users of different computing systems.

History of Related Art

Users often communicate over a network using, for example, text-based chat, audio and/or video. When the users are associated with different computing systems that each exert a degree of control over the users and their data, it becomes technically difficult to mediate communication with the users without destroying the different access and control interfaces imposed by each system. This is particularly challenging when the data exchanged between the users is sensitive data, as is the case with telemedicine systems.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of mediating user-to-user service between users of different computing systems. The method is performed by a middleware computing platform and includes maintaining an active user pool that includes a plurality of servicing users. The method also includes exposing an on-demand service-request interface to a plurality of user-to-user service platforms, where the plurality of user-to-user service platforms provide independent computing environments that separately execute user-to-user service workflows for requesting users. The method further includes receiving, via the on-demand service-request interface, a service request from a particular platform of the plurality of user-to-user service platforms. In addition, the method includes automatically selecting a servicing user from the active user pool based, at least in part, on real-time availability of the plurality of servicing users and information included in the service request. Furthermore, the method includes assigning the servicing user to the service request. The method also includes transmitting, to the servicing user, a uniform resource locator (URL) to the particular platform. In addition, the method includes transmitting, to the particular platform, a message identifying the servicing user, where the particular platform establishes a communication session between a requesting user and the servicing user over a network path that excludes the middleware computing platform, and where the particular platform executes a user-to-user service workflow via the communication session. Other embodiments of this aspect include corresponding computer systems, apparatus, and computer programs recorded on one or more computer storage devices, each configured to perform the actions of the methods.

In an embodiment, another general aspect includes a system that further includes a processor and memory. The processor and memory in combination are operable to implement a method. The method includes maintaining an active user pool that includes a plurality of servicing users. The method also includes exposing an on-demand service-request interface to a plurality of user-to-user service platforms, where the plurality of user-to-user service platforms provide independent computing environments that separately execute user-to-user service workflows for requesting users. The method further includes receiving, via the on-demand service-request interface, a service request from a particular platform of the plurality of user-to-user service platforms. In addition, the method includes automatically selecting a servicing user from the active user pool based, at least in part, on real-time availability of the plurality of servicing users and information included in the service request. Furthermore, the method includes assigning the servicing user to the service request. The method also includes transmitting, to the servicing user, a uniform resource locator (URL) to the particular platform. In addition, the method includes transmitting, to the particular platform, a message identifying the servicing user, where the particular platform establishes a communication session between a requesting user and the servicing user over a network path that excludes the system, and where the particular platform executes a user-to-user service workflow via the communication session.

In an embodiment, another general aspect includes a computer-program product that further includes a non-transitory computer-usable medium having computer-readable program code embodied therein. The computer-readable program code is adapted to be executed to implement a method. The method is performed by a middleware computing platform and includes maintaining an active user pool that includes a plurality of servicing users. The method also includes exposing an on-demand service-request interface to a plurality of user-to-user service platforms, where the plurality of user-to-user service platforms provide independent computing environments that separately execute user-to-user service workflows for requesting users. The method further includes receiving, via the on-demand service-request interface, a service request from a particular platform of the plurality of user-to-user service platforms. In addition, the method includes automatically selecting a servicing user from the active user pool based, at least in part, on real-time availability of the plurality of servicing users and information included in the service request. Furthermore, the method includes assigning the servicing user to the service request. The method also includes transmitting, to the servicing user, a uniform resource locator (URL) to the particular platform. In addition, the method includes transmitting, to the particular platform, a message identifying the servicing user, where the particular platform establishes a communication session between a requesting user and the servicing user over a network path that excludes the middleware computing platform, and where the particular platform executes a user-to-user service workflow via the communication session.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
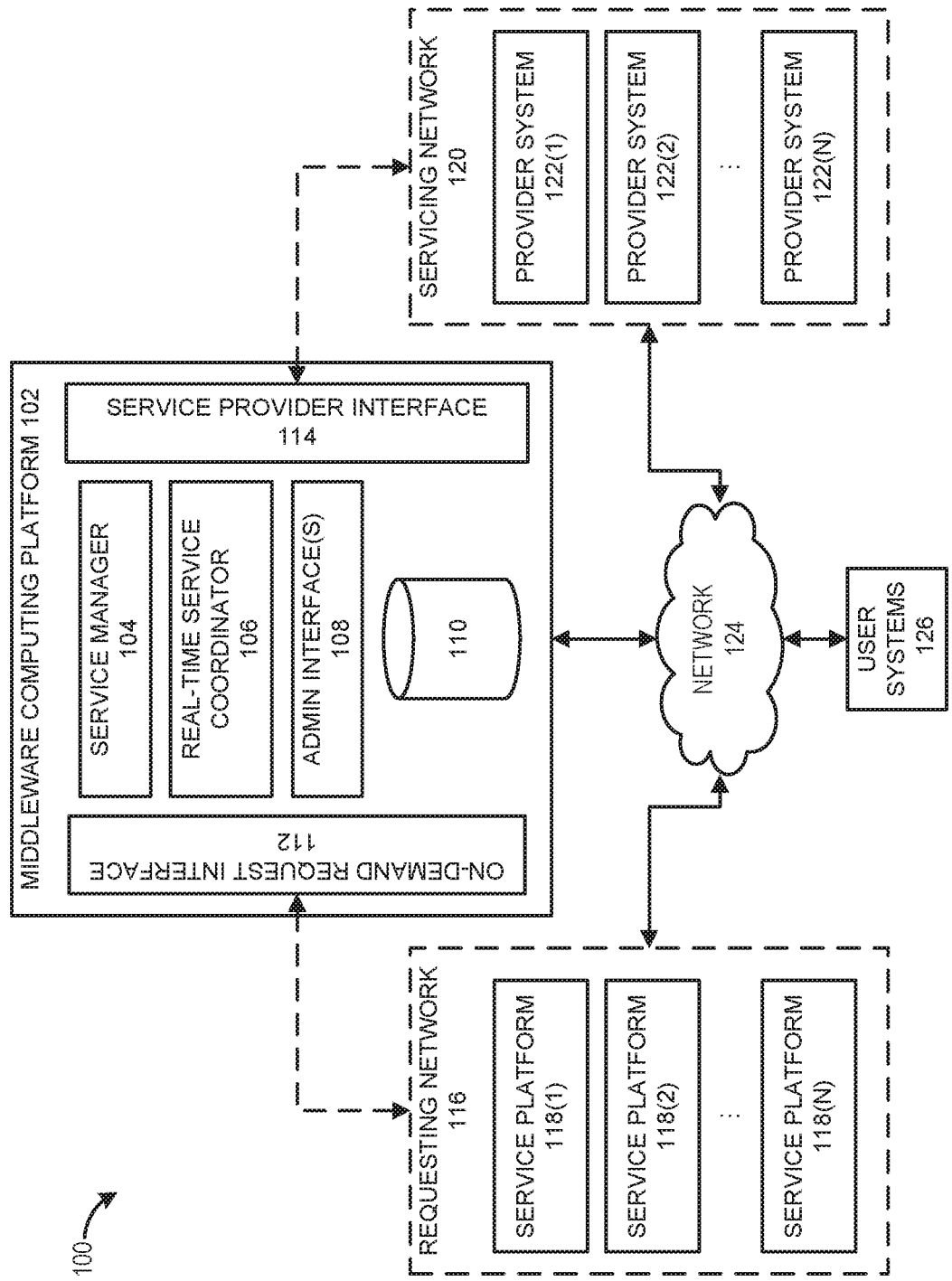
FIG. 1 illustrates an example computing environment for implementing a middleware computing platform.

User-to-user service between users can be conducted via an interactive communication session over a computer network. The interactive communication session can span, for example, a portion of the Internet. and incorporate various different communication modalities such as asynchronous communication, text-based chat, audio and/or video. In addition, or alternatively, the interactive communication session can encompass communication of a digital record that includes, for example, information extracted from a user via an electronic questionnaire or the like. In healthcare settings, the digital record can be a digital health record such as a chart or Subjective. Objective, Assessment and Plan (SOAP) note.

User-to-user service typically involves a requesting user who initiates a request for service and a servicing user who provides the service. In general, the user-to-user service can involve any service or expertise that involves a workflow and/or user communication of certain expertise. An example of user-to-user service is telemedicine, where technology is leveraged to provide remote clinical healthcare. According to this example, the requesting user can be a patient and the servicing user can be a suitable clinician such as a nurse or medical doctor.

In certain cases, it would be advantageous to enable requesting users from multiple different service platforms to potentially be served by a common set of servicing users, where any given servicing user can serve any requesting user on any of the different service platforms. These servicing users could be users of the same provider platform, or users distributed across multiple provider platforms. Problematically, however, service platforms may not want provider systems, or users from outside its own environment, to directly communicate with its requesting users or to have access to sensitive user data. Each service platform might wish to control all user-facing communication and interfaces with its requesting users for business and security reasons. As a further problem, different service platforms may have different requirements for servicing users and require different technical algorithms. All of these factors limit the ability to effectively add a middle layer between service platforms and provider systems. As such, there are technical barriers to integrating requesting users from multiple different service platforms with servicing users from one or more provider systems.

The present disclosure describes examples of systems and methods for middleware-mediated user-to-user service between users of different computing systems. In certain embodiments, a middleware computing platform can enable selection and assignment of servicing users to service requests, while allowing itself to be excluded from communication sessions between requesting users and servicing users. In certain embodiments, the middleware computing platform can thereafter monitor execution of user-to-user service workflows via separate event communication, for example, that is received from service platforms. Examples will be described below.

FIG. 1 illustrates an example computing environment 100 for implementing a middleware computing platform 102. The computing environment 100 includes the middleware computing platform 102, a requesting network 116, a servicing network 120 and user systems 126, each of which is operable to communicate over a computer network 124. The computer network 124 may be a private network, a public network, a local or wide area network, a portion of the Internet, combinations of the same, and/or the like.

In certain embodiments, the middleware computing platform 102 can centrally mediate user-to-user service between requesting users from the requesting network 116 and servicing users from the servicing network 120. For illustrative purposes, the requesting network 116 is shown to include three user-to-user service platforms, namely, a service platform 118(1), a service platform 118(2) and a service platform 118(N) (collectively, service platforms 118), and the servicing network 120 is shown to include three service provider systems, namely, a provider system 122(1), a provider system 122(2) and a provider system 122(3) (collectively, provider systems 122). It should be appreciated that, in various implementations, the requesting network 116 can include any number of user-to-user service platforms and the servicing network 120 can include any number of service provider systems.

The service platforms 118 of the requesting network 116 each provide independent computing environments that separately execute user-to-user service workflows for requesting users. In an example, the service platforms 118 can each be an independent telemedicine system that executes a telemedicine workflow. In general, the service platforms 118 are each configured to establish a communication session between a requesting user and a servicing user for purposes of executing the user-to-user service workflow. The user-to-user service workflow can be customized or specific to each of the service platforms 118 and, in various cases, can include a series or sequence of defined events such as a service-start event, a service-end event, a cancel event, and/or the like. The communication session can incorporate various different communication modalities such as asynchronous communication, text-based chat, audio, video, communication of digital records, combinations of the foregoing and/or the like. The provider systems 122 of the servicing network 120 each provide access to one or more servicing users that collectively constitute an active user pool. In general, the servicing users in the active user pool am those users who have been granted access to one or more of the provider systems 122 and will be considered by the middleware computing platform 102 for service assignments.

The user systems 126 can include any type of computing device, including computer systems such as desktops, laptops, tablets, smartphones, and wearable or body-borne computers, to name a few. The user systems 126 can be operated by any of the types of users described herein. For example, in various embodiments, the user systems 126 can be operated by requesting users associated with one or more the service platforms 118. In addition, or alternatively, the user systems 126 can be operated by servicing users associated with one or more of the provider systems 122. In addition, or alternatively, the user systems 126 can be operated by administrators or super users associated with any of the service platforms 118, the provider systems 122 and/or the middleware computing platform 102.

In certain embodiments, the middleware computing platform 102 can centrally mediate user-to-user service between requesting users from the requesting network 116 and servicing users from the servicing network 120. The middleware computing platform 102 is shown to include a service manager 104, a real-time service coordinator 106, one or more administrative interfaces 108, one or more data stores 110, an on-demand service-request interface 112 and a service provider interface 114. Although an example arrangement of components and modules is shown relative to the middleware computing platform 102, it should be appreciated that the functionality described with respect to these specific components and modules can be distributed among one, two, three, or any other suitable number of components or modules.

In an example, the middleware computing platform 102 can be implemented as a single management server. In another example, the middleware computing platform 102 can be implemented in a plurality of virtual or physical servers, which may or may not be geographically co-located. In some embodiments, the middleware computing platform 102 and/or other aspects of the computing environment 100 may be hosted on a cloud-provider system such as the Azure™ service provided by Microsoft® or the EC2™ platform provided by Amazon®.

In the illustrated embodiment, the middleware computing platform 102 exposes the on-demand service-request interface 112 to the requesting network 116 and the service provider interface 114 to the servicing network 120. The on-demand service-request interface 112 can represent, for example, a single or plurality of distinct interfaces designed to be accessed or called by the service platforms 118. Similarly, the service provider interface 114 can represent, for example, a single or plurality of distinct interfaces designed to be accessed or called by the provider systems 122. For example, the on-demand service-request interface 112 and the service provider interface 114 can each include an application programming interface (API) or a plurality of APIs.

The service manager 104 can manage, in parallel, a lifecycle of each individual service request that is received from the requesting network 116 via the on-demand service-request interface 112. For example, the lifecycle can begin with a receipt of a service request, include causing an automatic assignment of a servicing user to the service request, and end with either the conclusion or satisfaction of the service request or configurable post-processing related to the same. In various embodiments, the service manager 104 can further track progress of user-to-user service workflows executed by the service platforms 118 and collect data regarding service execution. Example operation of the service manager 104 will be described with respect to FIG. 3.

Advantageously, in certain embodiments, the service manager 104 can enable the middleware computing platform 102 to be configurably excluded from communication sessions and user-to-user service workflows that result from its operation. In an example, a service request can be received, via the on-demand service-request interface 112, from the service platform 118(1), where the service request relates to a particular requesting user. As part of its operation, the service manager 104 can cause a particular servicing user from the active user pool to be automatically assigned to the service request. Thereafter, the service platform 118(1) can establish a communication session between the particular requesting user and the assigned servicing user over a network path that excludes the middleware computing platform 102. In this manner, the service platform 118(1) executes a user-to-user service workflow via the communication session, but the communication session and related sensitive data need not pass through the middleware computing platform 102. An example will be described relative to FIG. 2.

As a further advantage, in certain embodiments, the service manager 104 can track progress of user-to-user service workflows executed by the service platforms 118 and collect data regarding service execution even when it is configurably excluded from communication sessions and user-to-user service workflows in the fashion described above. In particular examples, the service manager 104 can receive event communication from the service platforms 118, where the event communication notifies the service manager 104 of certain defined events in a given user-to-user workflow. In some cases, event communication can also be received from a servicing user via one of the user systems 126. An example will be described relative to FIG. 2.

The real-time service coordinator 106 can automatically execute assignments of servicing users to service requests in consideration of information included in the service requests and real-time selection criteria stored, for example, in the data store(s) 110. The real-time selection criteria can include, for example, selection settings, data related to availability of servicing users, data related to qualifications of servicing users, combinations of the foregoing and/or the like. Example operation of the real-time service coordinator 106 will be described with respect to FIG. 4.

In various embodiments, the selection settings used by the real-time service coordinator 106 can indicate, for specific service platforms of the service platforms 118 or for specific classes or categories of requesting users, automatic selection logic. The automatic selection logic can be, or identify, an algorithm for selecting a servicing user to assign to a service request. In an example, the automatic selection logic can involve different algorithms for scoring or rating servicing users, evaluating qualifications of servicing users, combinations of the foregoing and/or the like.

In various embodiments, the data related to availability of servicing users used by the real-time service coordinator 106 can be, or include, granular scheduling information that indicates periods of availability and unavailability for each servicing user in the active user pool, where such granular scheduling information is automatically updated by the real-time service coordinator 106 as requests are assigned. In addition, or alternatively, the data related to availability of servicing users can be, or include, information quantifying a current workload of each servicing user in the active user pool (e.g., a number of assigned service requests). In certain embodiments, availability can be toggled on to indicate availability or off to indicate unavailability. For example, the service manager 104, the real-time service coordinator 106 and/or the administrative interface(s) 108 can cause the availability to be toggled on and off for particular servicing users or particular groups of servicing users. In some cases, the toggling can be initiated by the servicing users themselves via the user systems 126. Also, in some cases, the toggling can be initiated or caused by any of the data related to availability described previously (e.g., scheduling information, workload information, etc.).

In various embodiments, the data related to qualifications of servicing users used by the real-time service coordinator 106 can be, or include, characterizations of an expertise of each of the servicing users in the active user pool (e.g., specialties, certifications, etc.). In various cases, the data related to qualifications of servicing users can be received, or accessed from, the provider systems 122. In addition, or alternatively, the data related to qualifications of servicing users used by the real-time service coordinator 106 can be, or include, metrics related to the servicing users' performance in service requests mediated by the middleware computing platform 102. These metrics can include, for example, average response time after case assignment, average satisfaction score received from requesting users for completed service requests, percentage or number of service requests that are declined and/or other information.

The administrative interface(s) 108 can publish a configuration interface, for example, to administrators, super users or other users to select or specify commands and/or provide data. In addition, or alternatively, the administrative interface(s) 108 can generate regular or on-demand reports related to system operation and/or any other component of the computing environment 100. The administrative interface(s) 108 can publish reports or other generated information, for example, to a web page, user dashboard, and/or the like. The web page, user dashboard or other user interface(s) output, for example, by the administrative interface(s) 108, can be accessed by appropriate users of the user systems 126. The administrative interface(s) 108 can also provide a user interface, for instance, that allows the users of the user systems 126 to obtain customized data related to data maintained by the data store(s) 110.

The configuration interface or data that is published via the administrative interface(s) 108 can be specific, for example, to a given system for which a given user is an administrator or super user. In an example, an administrator or super user of the service platform 118(1) may be given a configuration interface that enables input or selection of selection settings, and also a dashboard for platform-specific data. In another example, an administrator or super user of the provider system 122(1) may be given a configuration interface that enables input or selection of servicing users for the active user pool, and also a dashboard for provider-specific data. In still another example, an administrator or super user of the middleware computing platform 102 may be given a configuration interface that allows selection or specification of commands that impact overall system operation, and also a dashboard for system-wide data. Other examples will be apparent to one skilled in the art after reviewing the present disclosure. As discussed previously, any of the foregoing user types may be operators of the user systems 126.

In general, the data store(s) 110 can include any information collected, stored or used by the middleware computing platform 102. For example, in various embodiments, the data store(s) 110 can include selection settings, data related to availability of servicing users, data related to qualifications of servicing users, data collected or received from the service platforms 118, data collected or received from the provider systems 122, data collected or received from servicing users, data identifying servicing users in the active user pool, combinations of the same and/or the like. In certain embodiments, data stored in the data store(s) 110 can take the form of repositories, flat files, databases, etc.

Figure 2:
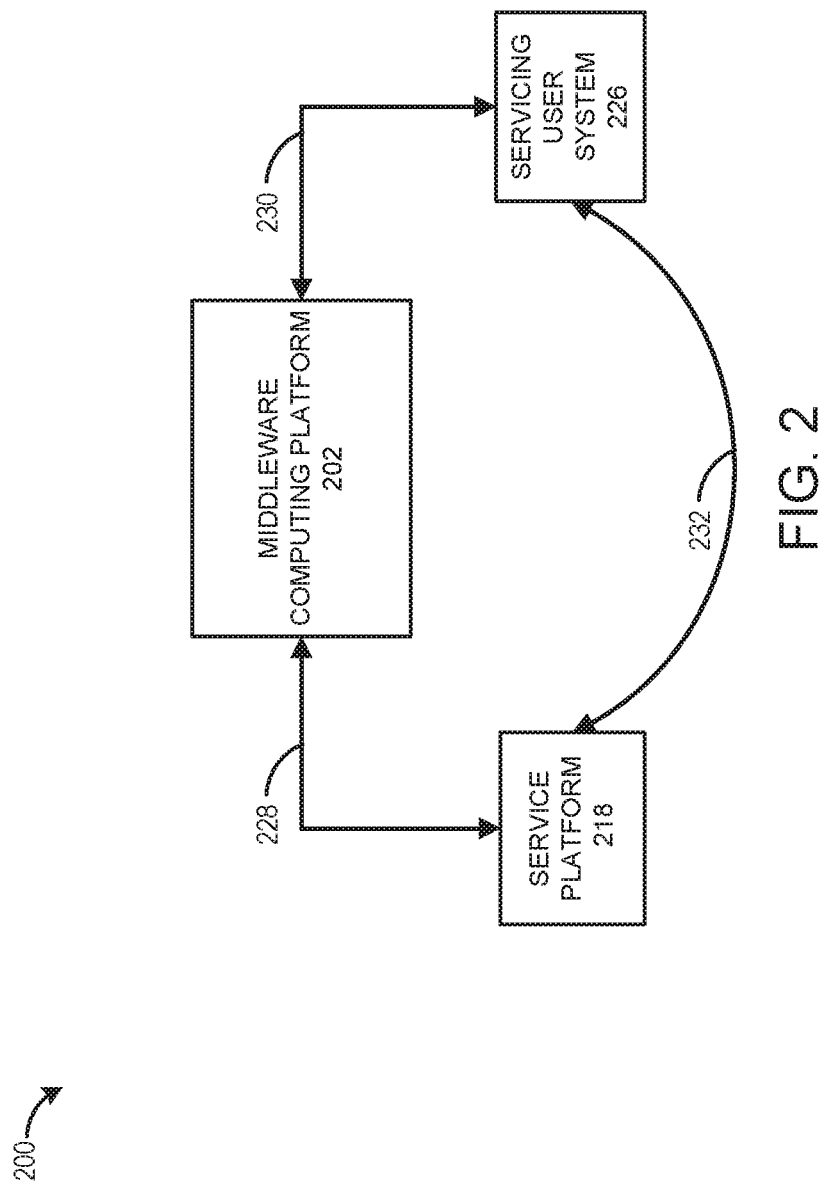
FIG. 2 illustrates an example computing environment for implementing a middleware computing platform.

FIG. 2 illustrates an example computing environment 200 for implementing a middleware computing platform 202. The computing environment 200 includes the middleware computing platform 202, a service platform 218 and a servicing user system 226. In general, the middleware computing platform 202 and the service platform 218 operate as described relative to the middleware computing platform 102 and the service platforms 118, respectively, of FIG. 1. The servicing user system 226 can operate as described relative to the user systems 126. More specifically, for purposes of the example of FIG. 2, the servicing user system 226 is operated by a servicing user in an active user pool as described relative to FIG. 1.

In the example of FIG. 2, network paths 228, 230 and 232 are shown. The network path 228 can include communication that occurs via the on-demand service-request interface 112. Communication over the network path 228 can include, for example, receipt of a service request, event communication, etc. The network path 230 can include communication that occurs with an assigned servicing user via the service provider interface 114, and can include or pass through a provider system similar to the provider systems 122 of FIG. 1. In general, the network path 232 is representative of a path over which a communication session is established between the service platform 218 and the servicing user system 226. The service platform 218 accordingly executes a user-to-user service workflow via the communication session. The network path 232 excludes the middleware computing platform 202. As such, the service platform 218 tracks the execution of the user-to-user service workflow via, for example, event communication directly from the service platform 218 to the middleware computing platform 202. The event communication can include, for example, identification of a service-start event, a service-end event, a cancel event, combinations of the foregoing and/or the like.

Figure 3:
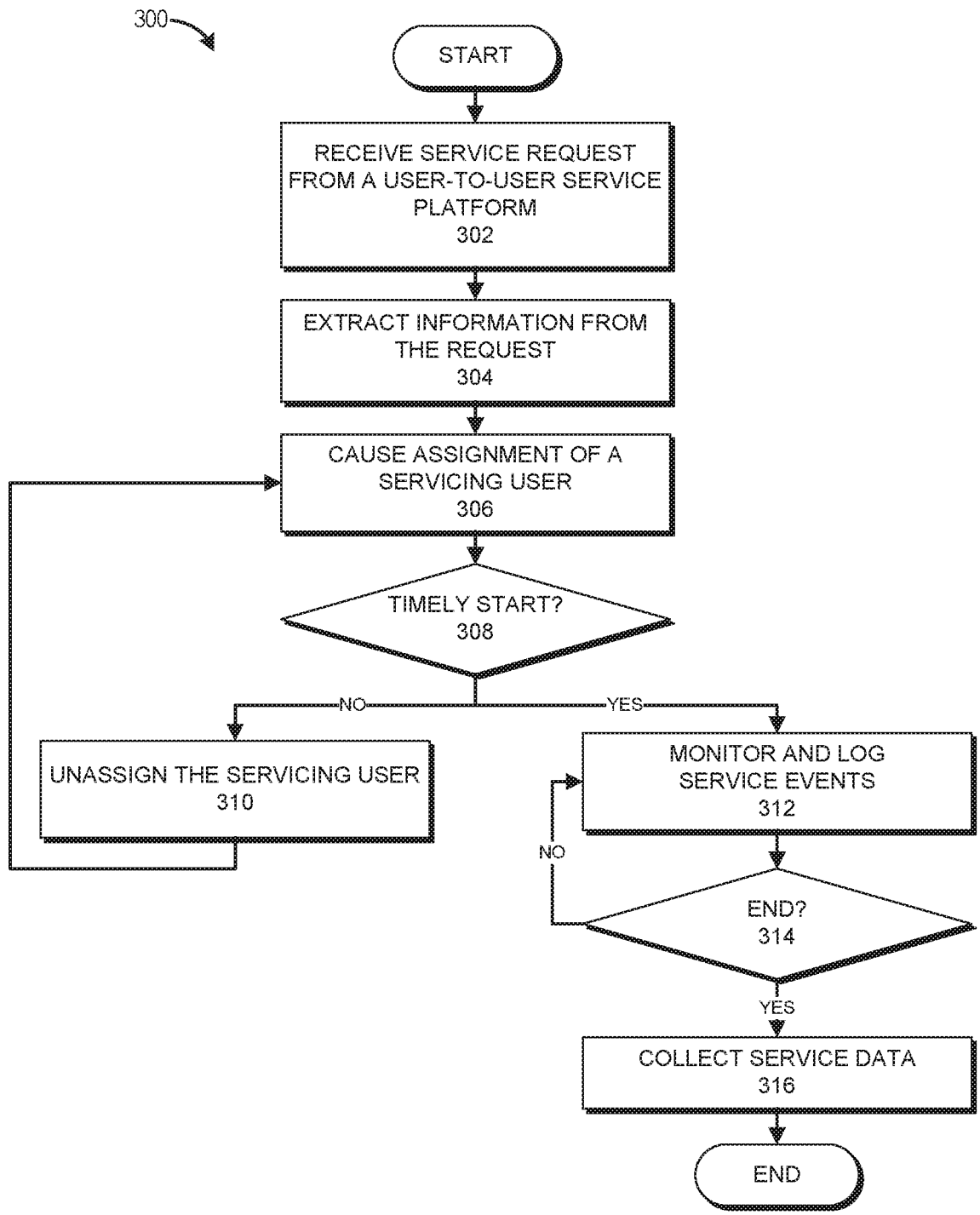
FIG. 3 illustrates an example of a process for mediating user-to-user service between users of different computing systems.

FIG. 3 illustrates an example of a process 300 for mediating user-to-user service between users of different computing systems. In certain embodiments, the process 300 can be executed, for example, by the service manager 104 or the real-time service coordinator 106. The process 300 can also be executed generally by the middleware computing platform 102 of FIG. 1. Although the process 300 can be executed by any number of different components, to simplify discussion, the process 300 will be described relative to the middleware computing platform 102 and, more particularly, the service manager 104 of FIG. 1. As described relative to FIG. 1, the middleware computing platform 102 exposes the on-demand service-request interface 112 to the service platforms 118, and maintains the active user pool described with respect to FIG. 1.

At block 302, the service manager 104 receives, via the on-demand service-request interface 112, a service request from the service platform 118(1). Although the service request is described as originating from the service platform 118(1) for illustrative purposes, it should be appreciated that the service request could be received from any of the service platforms 118. Examples of information that can be included in the service request is shown below in Table 1.

TABLE 1

| Attribute | Description |
|---|---|
| Request Identifier | Identifier for the service request. |
| Requesting User Identifier | Identifier of a requesting user. |
| Service Uniform Resource Locator (URL) | URL for an assigned servicing user to follow upon accepting a service assignment (for later use). |
| Communication Modality | Identification of a communication modality such as asynchronous communication, text-based chat, audio and/or video. |
| Servicing User Type | Identification of a type of servicing user requested. |
| Qualification Data | Data that further qualifies servicing users to fulfill the service request. |
| Preferred Servicing | Identifier of a preferred servicing user to fulfill the |

TABLE 1-continued

| Attribute | Description |
| --- | --- |
| User | service request. |
| Service Rate Identifier | Identifier of a pay rate for the service request. |

At block 304, the service manager 104 extracts information from the service request. At block 306, the service manager 104 causes an assignment of a servicing user from the active user pool to the service request. In general, the block 306 can involve the service manager 104 triggering operation of the real-time service coordinator 106 so as to cause the assignment. Example operation of the real-time service coordinator 106 will be described in greater detail with respect to FIG. 4.

In general, blocks 308-316 relate to an ability of the service manager 104 to track progress of an execution of a user-to-user service workflow by the service platform 118 (1). At decision block 308, the service manager 104 automatically determines whether a service-start event has been timely received from the service platform 118(1). In general, the decision block 308 can involve automatically determining whether a service-start event has been received from the service platform 118(1) within a period of time. The period of time can be a configurable predetermined period of time and, in some cases, might be based on a service level agreement with an operator of the service platform 118(1). In addition, or alternatively, the period of time can be algorithmically determined as a function of one or more variables. In an example, the period of time can be computed by multiplying an SLA-specified period by a constant (e.g., a value between 0 and 1). If it is determined, at the decision block 308, that a service-start event has not been timely received from the service platform 118(1), at block 310, the service manager 104 unassigns the assigned servicing user. In some embodiments, the block 310 can include transmitting, to the service platform 118(1), a message indicating the unassignment. From block 310, the process 300 returns to the block 306 so that the service manager 104 can cause assignment of another servicing user from the active user pool.

If it is determined, at the decision block 308, that a service-start event has been timely received from the service platform 118(1), at block 312, the service manager 104 monitors execution of the user-to-user service workflow by the service platform 118(1) via event communication from the service platform 118(1). The event communication can be received, for example, via the on-demand service-request interface 112, using a network path similar to the network path 228 of FIG. 2. In general, the block 312 can include logging, in the data store(s) 110, each even that is identified via the event communication.

At decision block 314, the service manager 104 determines whether a service-end event has been received via the event communication. If not, the process 300 returns to block 312 and executes as described previously. Otherwise, if it is determined, at the decision block 314, that a service-end event has been received via the event communication, the process 300 proceeds to block 316.

At block 316, the service manager 104 collects service data related to the execution of the user-to-user service workflow. In an example, the service data can include an evaluation or rating of the assigned servicing user by the requesting user. In another example, the service data can include information related to the performance of the user-to-user service workflow such as, for example, time elapsed between events and/or other information. The service data that is collected at the block 316 can be stored in the data store(s) 110. In some embodiments, the block 316 can be omitted or executed separately from the process 300. After block 316, the process 300 ends.

For simplicity of description, the process 300 is described as being performed with respect to a single service request. It should be appreciated that, in a typical embodiment, the middleware computing platform 102 manages many such service requests in parallel. For example, in various embodiments, the middleware computing platform 102 can simultaneously execute many hundreds or thousands of iterations of the process 300 in parallel for many hundreds or thousands of service requests.

Figure 4:
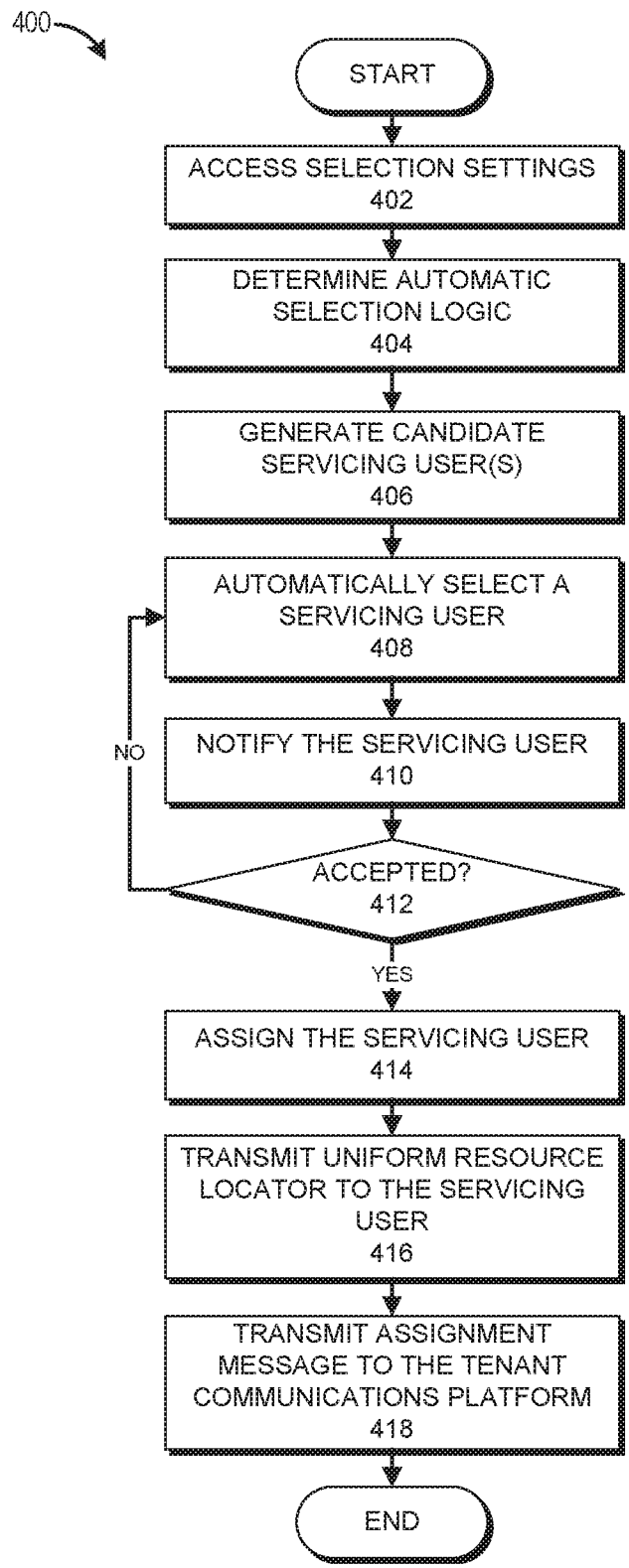
FIG. 4 illustrates an example of a process for executing assignments of servicing users to service requests.

FIG. 4 illustrates an example of a process 400 for executing assignments of servicing users to service requests. In certain embodiments, the process 400 can be performed as part of, or in response to, execution of the block 306 of the process 300 of FIG. 3. In certain embodiments, the process 400 can be executed, for example, by the service manager 104 or the real-time service coordinator 106. The process 400 can also be executed generally by the middleware computing platform 102 of FIG. 1. Although the process 400 can be executed by any number of different components, to simplify discussion, the process 400 will be described relative to the middleware computing platform 102 and, more particularly, the real-time service coordinator 106 of FIG. 1.

At block 402, the real-time service coordinator 106 accesses selection settings that are applicable to a service request. In certain embodiments, the applicable selection settings can be retrieved from the data store(s) 110 as described with respect to FIG. 1. In various cases, the applicable selection settings can be specific to a particular service platform, of the service platforms 118, that originally transmitted the service request. In other cases, the applicable selection settings can be specific to a category or type of requesting user, or specific to information included in the service request. In still other cases, a default set of selection settings can be used across all service requests.

At block 404, the real-time service coordinator 106 determines automatic selection logic based on the applicable selection settings. For example, in embodiments in which the applicable selection settings are specific to a particular service platform, the block 404 can involve the real-time service coordinator 106 determining the automatic selection logic for the particular service platform based on the selection settings. The automatic selection logic can include, for example, variable scoring methodologies that each sum or weight various data parameters related to servicing users.

At block 406, the real-time service coordinator 106 generates candidate servicing user(s) using the automatic selection logic. The automatic selection logic can take into account, for example, real-time availability of servicing users in the active user pool and/or information included in the service request. In certain embodiments, the block 406 can yield a list of the candidate servicing user(s). In an example, the list can score or rank the candidate servicing user(s) as specified, for example, by the automatic selection logic.

With reference to the real-time availability of servicing users in the active user pool, the block 406 can involve excluding unavailable servicing users from the candidate servicing users. Availability or unavailability can be a configurable determination that, in some cases, is specified or customizable in the automatic selection logic. In one example, servicing users who are assigned to another service request for which service has not concluded can be deemed unavailable. In another example, servicing users who have more than a threshold number of unconcluded service requests in their queue can be deemed unavailable. In still another example, unavailability can be based on scheduling, where servicing users who are already scheduled for other service requests at a given time are deemed unavailable for any other service requests spanning that time. In yet another example, unavailability can be based on whether availability is on (i.e., available) or off (i.e., unavailable) based on toggling as described previously.

In many cases, unavailability can vary based on communication modality. Servicing users who are assigned to another service request for which service has not concluded might be deemed available for some communication modalities and unavailable for others. For example, servicing users who are assigned to an uncompleted service request involving audio or video communication might be deemed unavailable for any additional service requests. In another example, servicing users who are assigned to an uncompleted service request involving asynchronous communication might be deemed unavailable for additional service requests involving audio or video communication but available for additional service requests involving asynchronous communication. In still another example, servicing users can be excluded from and deemed unavailable for, certain service requests based on availability override settings. This type of unavailability can be preference-based and determined by evaluating the availability override settings against information specified in a service request such as, for example, a servicing user type, qualification data, a preferred servicing user, a service rate identifier, and/or other information. In some embodiments, the availability override settings can originate from individual servicing users and/or corresponding providers with which the individual servicing users are affiliated.

As stated previously, the candidate servicing users can be generated based, at least in part, on information included in the service request. In an example, with reference to Table 1 above, if the service request specifies a servicing user type, qualification data and/or a service rate identifier, the block 406 can include excluding servicing users who are not of the specified servicing user type, who do not satisfy the qualification data and/or who are not made available at the identified service rate. In another example, still with reference to Table 1 above, if the service request specifies a preferred servicing user, the block 406 can include identifying the preferred servicing user. In some such cases, the process 400 can be simplified or bypassed entirely in favor of simply selecting and assigning the preferred servicing user.

Also as stated previously, the candidate servicing users can be scored or ranked based on configurable criteria. The configurable criteria can be specified, for example, in the automatic selection logic. In an example, the configurable criteria can include various data parameters such as, for example, satisfaction scores, a percentage of assignments that are accepted, and/or other data. The data parameters that are included in the configurable criteria can be configurably weighted to suit a given implementation. In various embodiments, resulting scores can be normalized to facilitate comparison.

At block 408, the real-time service coordinator 106 automatically selects a servicing user. In a typical embodiment, the automatically selecting can include identifying the servicing user via the automatic selection logic. For example, in various embodiments, the block 408 can include selecting or identifying a highest scored or ranked servicing user from among the candidate servicing users. At block 410, the real-time service coordinator 106 notifies the selected servicing user. In general, the notification can prompt the user to accept or decline the service request. The notification can be any form of communication such as text message, email, instant message, push notification, dashboard notification, combinations of the foregoing and/or the like.

At decision block 412, the real-time service coordinator 106 determines whether an acceptance has been received from the selected servicing user. In some embodiments, the lack of receipt of an acceptance within a configurable period of time can be considered a declination of the service request. If it is determined, at the decision block 412, that no acceptance has been received from the selected servicing user, a declination can be logged in the data store(s) 110 for the selected servicing user, and the process 400 returns to the block 408 for selection of another servicing user from the candidate servicing users. Otherwise, if it is determined, at the decision block 412, that an acceptance has been received from the selected servicing user, an acceptance can be logged in the data store(s) 110 for the selected servicing user and the process 400 proceeds to block 414.

At block 414, the real-time service coordinator 106 assigns the selected servicing user to the service request. In a typical embodiment, the assignment is logged in the data store(s) 110 and thereafter taken into account when determining availability for other service requests. At block 416, the real-time service coordinator 106 transmits, to the assigned servicing user, a URL to the particular service platform that originally transmitted the service request. In some embodiments, as shown above relative to Table 1, the service request originally received from the particular service platform can include the URL. In many cases, the URL can direct to a page that prompts the assigned servicing user to initiate a user-to-user service workflow, thereby resulting in a service-start event.

At block 418, the real-time service coordinator 106 transmits, to the particular service platform that originally transmitted the service request, a message identifying the assigned servicing user. In a typical embodiment, the particular service platform thereafter waits for the assigned servicing user to navigate to the URL transmitted at the block 416, at which point the particular service platform establishes a communication session between a requesting user associated with the service request and the assigned servicing user. As described previously, the communication session is typically established over a network path that excludes the middleware computing platform 102, and the communication session is used to execute the user-to-user service workflow. After block 418, the process 400 ends.

Figure 5:
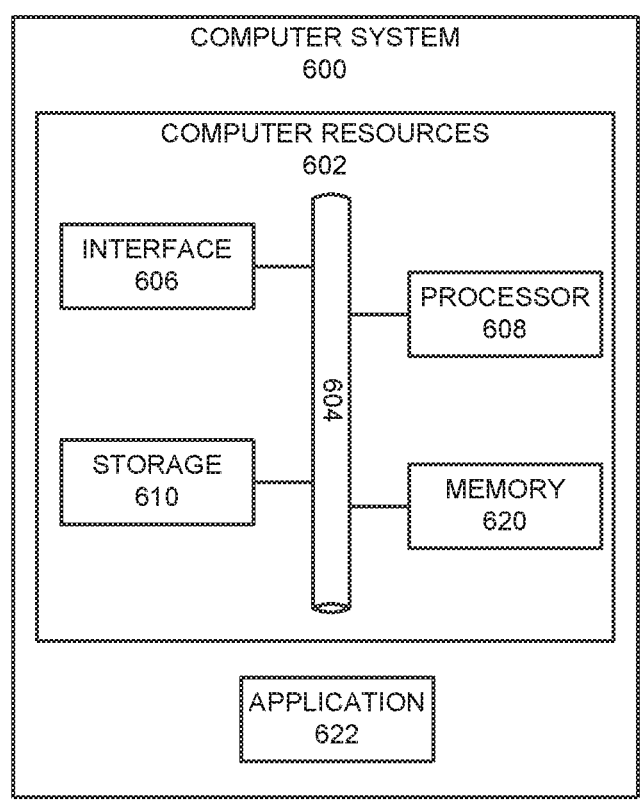
FIG. 5 illustrates an example of a computer system.

FIG. 5 illustrates an example of a computer system 600. In some cases, the computer system 600 can be representative, for example, of any of the service platforms 118, the provider systems 122, the user systems 126, and/or the middleware computing platform 102 or components thereof. The computer system 600 includes an application 622 operable to execute on computer resources 602. In particular embodiments, the computer system 600 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 600 may include any suitable physical form, configuration, number, type and/or layout. As an example, and not by way of limitation, the computer system 600 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606 and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components. (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. For example, in various embodiments, storage 610 can store any of the data described above relative to the data store(s) 110. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may include any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices and/or any other computer systems. As an example, and not by way of limitation, communication interface 606 may include a network interface controller (NIC) or network adapter for communicating with an Ethernet or other wire-based network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently. e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of mediating user-to-user service between users of different computing systems, the method comprising, by a middleware computing platform:
    maintaining an active user pool comprising a plurality of servicing users;
    exposing an on-demand service-request interface to a plurality of user-to-user service platforms, wherein the plurality of user-to-user service platforms provide independent computing environments that separately execute user-to-user service workflows for requesting users;
    receiving, via the on-demand service-request interface, a service request from a particular platform of the plurality of user-to-user service platforms;
    automatically selecting a servicing user from the active user pool based, at least in part, on real-time availability of the plurality of servicing users and information included in the service request;
    assigning the servicing user to the service request;
    transmitting, to the servicing user, a uniform resource locator (URL) to the particular platform;
    transmitting, to the particular platform, a message identifying the servicing user, wherein the particular platform establishes a communication session between a requesting user and the servicing user over a network path that excludes the middleware computing platform, and wherein the particular platform executes a user-to-user service workflow via the communication session;
    automatically determining that no start event has been received from the particular platform within a predetermined period of time; and
    responsive to the automatically determining:
        unassigning the servicing user from the service request;
        automatically selecting a second servicing user from the active user pool based, at least in part, on the real-time availability of the plurality of servicing users and the information included in the service request:
        assigning the second servicing user to the service request;
        transmitting, to the second servicing user, the URL to the particular platform; and
    transmitting, to the particular platform, a message identifying the second servicing user, wherein the particular platform establishes a second communication session between the requesting user and the second servicing user over a network path that excludes the middleware computing platform, and wherein the particular platform executes a user-to-user service workflow via the second communication session.

2. The method of claim 1, comprising tracking progress of the user-to-user service workflow executed by the particular platform via event communication from at least one of the particular platform and a device associated with the servicing user.

3. The method of claim 2, wherein the tracking progress comprises logging events identified via the event communication.

4. The method of claim 1, comprising:
    prior to the assigning:
        accessing selection settings for the particular platform; and
        determining automatic selection logic for the particular platform based on the selection settings; and
    wherein the automatically selecting comprises identifying the servicing user via the automatic selection logic.

5. The method of claim 1, comprising:
    responsive to the automatically selecting, notifying the servicing user;
    responsive to the notifying, receiving an acceptance from the servicing user; and
    wherein the assigning is performed responsive to the receiving the acceptance.

6. The method of claim 1, wherein the service request comprises the URL.

7. The method of claim 6, wherein the URL directs to a page that prompts the servicing user to initiate the user-to-user service workflow.

8. The method of claim 1, wherein the communication session comprises a modality selected from the group consisting of: asynchronous communication, chat, audio, and video.

9. The method of claim 1, wherein the plurality of user-to-user service platforms comprise independent telemedicine systems.

10. An system comprising a processor and memory, wherein the processor and memory in combination are operable to implement a method comprising:
    maintaining an active user pool comprising a plurality of servicing users;
    exposing an on-demand service-request interface to a plurality of user-to-user service platforms, wherein the plurality of user-to-user service platforms provide independent computing environments that separately execute user-to-user service workflows for requesting users;

receiving, via the on-demand service-request interface, a service request from a particular platform of the plurality of user-to-user service platforms;

automatically selecting a servicing user from the active user pool based, at least in part, on real-time availability of the plurality of servicing users and information included in the service request;

assigning the servicing user to the service request;

transmitting, to the servicing user, a uniform resource locator (URL) to the particular platform;

transmitting, to the particular platform, a message identifying the servicing user, wherein the particular platform establishes a communication session between a requesting user and the servicing user over a network path that excludes the system, and wherein the particular platform executes a user-to-user service workflow via the communication session;

automatically determining that no start event has been received from the particular platform within a predetermined period of time; and responsive to the automatically determining:
unassigning the servicing user from the service request;
automatically selecting a second servicing user from the active user pool based, at least in part, on the real-time availability of the plurality of servicing users and the information included in the service request;
assigning the second servicing user to the service request;
transmitting, to the second servicing user, the URL to the particular platform; and
transmitting, to the particular platform, a message identifying the second servicing user, wherein the particular platform establishes a second communication session between the requesting user and the second servicing user over a network path that excludes the system, and wherein the particular platform executes a user-to-user service workflow via the second communication session.

11. The system of claim 10, the method comprising tracking progress of the user-to-user service workflow executed by the particular platform via event communication from at least one of the particular platform and a device associated with the servicing user.

12. The system of claim 11; wherein the tracking progress comprises logging events identified via the event communication.

13. The system of claim 10, the method comprising:
prior to the assigning:
accessing selection settings for the particular platform; and
determining automatic selection logic for the particular platform based on the selection settings; and
wherein the automatically selecting comprises identifying the servicing user via the automatic selection logic.

14. The system of claim 10, the method comprising:
responsive to the automatically selecting, notifying the servicing user;
responsive to the notifying, receiving an acceptance from the servicing user; and wherein the assigning is performed responsive to the receiving the acceptance.

15. The system of claim 10, wherein the service request comprises the URL.

16. The system of claim 15, wherein the URL directs to a page that prompts the servicing user to initiate the user-to-user service workflow.

17. The system of claim 10, wherein the communication session comprises a modality selected from the group consisting of: asynchronous communication, chat, audio, and video.

18. A computer-program product comprising a non-transitory computer-usable medium having computer-readable program code embodied therein, the computer-readable program code adapted to be executed to implement a method comprising, by a middleware computing platform:

maintaining an active user pool comprising a plurality of servicing users;

exposing an on-demand service-request interface to a plurality of user-to-user service platforms, wherein the plurality of user-to-user service platforms provide independent computing environments that separately execute user-to-user service workflows for requesting users;

receiving, via the on-demand service-request interface, a service request from a particular platform of the plurality of user-to-user service platforms;

automatically selecting a servicing user from the active user pool based, at least in part, on real-time availability of the plurality of servicing users and information included in the service request;

assigning the servicing user to the service request;

transmitting, to the servicing user, a uniform resource locator (URL) to the particular platform;

transmitting, to the particular platform, a message identifying the servicing user, wherein the particular platform establishes a communication session between a requesting user and the servicing user over a network path that excludes the middleware computing platform, and wherein the particular platform executes a user-to-user service workflow via the communication session;

automatically determining that no start event has been received from the particular platform within a predetermined period of time; and responsive to the automatically determining:
unassigning the servicing user from the service request;
automatically selecting a second servicing user from the active user pool based, at least in part, on the real-time availability of the plurality of servicing users and the information included in the service request;
assigning the second servicing user to the service request;
transmitting, to the second servicing user, the URL to the particular platform; and
transmitting, to the particular platform, a message identifying the second servicing user, wherein the particular platform establishes a second communication session between the requesting user and the second servicing user over a network path that excludes the system, and wherein the particular platform executes a user-to-user service workflow via the second communication session.

* * * * *